(12) United States Patent
Kilroy et al.

(10) Patent No.: US 12,445,491 B2
(45) Date of Patent: Oct. 14, 2025

(54) PROTOCOL SWITCHING AND SECURE SOCKETS LAYER (SSL) CROSS-WIRING TO ENABLE INTER-NETWORK RESOURCE CONNECTIVITY

(71) Applicant: VMware LLC, Palo Alto, CA (US)

(72) Inventors: John Kilroy, Portsmouth, NH (US);
Patrick Peralta, Arlington, MA (US);
Glenn Bruce McElhoe, Arlington, MA (US)

(73) Assignee: VMware LLC, Palo Alto, CA (US)

( * ) Notice: Subject to any disclaimer, the term of this patent is extended or adjusted under 35 U.S.C. 154(b) by 245 days.

(21) Appl. No.: 18/121,671

(22) Filed: Mar. 15, 2023

(65) Prior Publication Data
US 2024/0244081 A1 Jul. 18, 2024

Related U.S. Application Data

(60) Provisional application No. 63/439,656, filed on Jan. 18, 2023.

(51) Int. Cl.
    *H04L 9/40* (2022.01)
(52) U.S. Cl.
    CPC .......... *H04L 63/166* (2013.01); *H04L 63/029* (2013.01)
(58) Field of Classification Search
    CPC ........................... H04L 63/166; H04L 63/029
    See application file for complete search history.

(56) References Cited

U.S. PATENT DOCUMENTS

| | | | |
|---|---|---|---|
| 9,485,323 B1* | 11/2016 | Stickle | H04L 67/10 |
| 10,075,459 B1* | 9/2018 | Suryanarayanan | H04L 63/1416 |
| 11,431,497 B1* | 8/2022 | Liguori | H04L 9/0897 |
| 2006/0031407 A1* | 2/2006 | Dispensa | H04L 61/25 709/219 |
| 2010/0070634 A1* | 3/2010 | Ranjan | H04L 63/205 709/228 |

(Continued)

OTHER PUBLICATIONS

Faisal, Abu, and Mohammad Zulkernine. "A secure architecture for TCP/UDP-based cloud communications." International Journal of Information Security 20.2 (2021): 161-179.*

(Continued)

*Primary Examiner* — Jimmy H Tran
(74) *Attorney, Agent, or Firm* — King Intellectual Asset Management

(57) ABSTRACT

Aspects of protocol switching and cross-wiring to enable inter-network connectivity are described. For example, a transporter system including a transporter server and a transporter client can securely connect applications to resources in differing networked environments (e.g., clouds and/or data centers). The transporter client may establish data channels as secure socket layer (SSL) connections (e.g., Secure Websockets (WSS)) between a resource in one networked environment and a transporter server that is in communication via a proxy channel with an initiator device in another networked environment. Upon completing the build of a data path between the initiator device and the resource, the handling protocol of the data channels that are established as SSL connections can be modified to a basic socket-level channel (e.g., transmission control protocol, user datagram protocol, etc.) to permit socket-level data stream communications without restrictions.

20 Claims, 4 Drawing Sheets

(56) References Cited

U.S. PATENT DOCUMENTS

| | | | |
|---|---|---|---|
| 2011/0154473 A1* | 6/2011 | Anderson | H04L 63/1483 726/11 |
| 2011/0173441 A1* | 7/2011 | Bagepalli | H04L 63/02 713/153 |
| 2012/0002815 A1* | 1/2012 | Wei | H04L 63/0272 380/270 |
| 2012/0036231 A1* | 2/2012 | Thakur | H04L 45/00 709/227 |
| 2012/0281708 A1* | 11/2012 | Chauhan | H04L 67/141 370/401 |
| 2013/0263241 A1* | 10/2013 | Agarwal | H04L 63/0815 726/8 |
| 2013/0297814 A1* | 11/2013 | Annamalaisami | H04L 69/26 709/230 |
| 2014/0041010 A1* | 2/2014 | Udupa | H04L 63/10 726/10 |
| 2014/0059205 A1* | 2/2014 | Mohammed | H04L 69/163 709/224 |
| 2014/0108665 A1* | 4/2014 | Arora | H04L 67/563 709/227 |
| 2014/0244851 A1* | 8/2014 | Lee | H04L 45/54 709/228 |
| 2014/0304498 A1* | 10/2014 | Gonuguntla | H04L 63/0281 713/151 |
| 2014/0331297 A1* | 11/2014 | Innes | H04L 63/0823 726/7 |
| 2014/0344925 A1* | 11/2014 | Muthiah | H04L 61/4511 726/22 |
| 2015/0089034 A1* | 3/2015 | Stickle | H04L 41/18 709/223 |
| 2015/0195182 A1* | 7/2015 | Mathur | G06F 11/2289 714/27 |
| 2016/0352870 A1* | 12/2016 | Manapragada | G06F 13/4282 |
| 2017/0085502 A1* | 3/2017 | Biruduraju | H04L 12/4641 |
| 2017/0163693 A1* | 6/2017 | Skuratovich | H04L 69/161 |
| 2018/0343238 A1* | 11/2018 | Tola | H04L 63/0421 |
| 2019/0028536 A1* | 1/2019 | Chauhan | H04L 12/6418 |
| 2020/0036796 A1* | 1/2020 | Tollet | H04L 12/4633 |
| 2020/0244770 A1* | 7/2020 | Cooley | H04L 67/125 |
| 2021/0168090 A1* | 6/2021 | Momchilov | H04L 47/628 |
| 2022/0103593 A1* | 3/2022 | Singh | H04L 63/0245 |
| 2022/0129514 A1* | 4/2022 | Shribman | G06F 9/547 |
| 2022/0131957 A1* | 4/2022 | Momchilov | H04L 69/162 |
| 2022/0278927 A1* | 9/2022 | Mariappan | H04L 45/745 |
| 2022/0368676 A1* | 11/2022 | Shribman | H04L 67/56 |
| 2023/0327900 A1* | 10/2023 | Shribman | H04L 67/63 709/203 |
| 2023/0336414 A1* | 10/2023 | Miriyala | H04L 45/42 |
| 2023/0353542 A1* | 11/2023 | Kilroy | H04L 63/029 |
| 2024/0073087 A1* | 2/2024 | Henkel | G06F 9/5077 |
| 2024/0195681 A1* | 6/2024 | Shetye | H04L 67/10 |
| 2024/0273160 A1* | 8/2024 | Kol | G06F 9/455 |

OTHER PUBLICATIONS

Herrero, Rolando. "Analysis of the constrained application protocol over quick UDP internet connection transport." Internet of Things 12 (2020): 100328.*

Chen, Shan, et al. "Secure communication channel establishment: TLS 1.3 (over TCP fast open) versus QUIC." Journal of Cryptology 34.3 (2021): 26.*

* cited by examiner

PROTOCOL SWITCHING AND SECURE SOCKETS LAYER (SSL) CROSS-WIRING TO ENABLE INTER-NETWORK RESOURCE CONNECTIVITY

CROSS-REFERENCE TO RELATED APPLICATIONS

This application claims the benefit of and priority to U.S. Provisional Patent Application No. 63/439,656 filed on Jan. 18, 2023, entitled "PROTOCOL SWITCHING AND CHANNEL CROSS-WIRING TO ENABLE INTER-NETWORK RESOURCE CONNECTIVITY," the contents of which are incorporated by reference in their entirety herein.

BACKGROUND

In recent years, enterprises have started to move some of their computer and network resources to clouds, while maintaining other resources in private datacenters. Cloud computing systems can extend the capabilities of an organization's data center using computing resources such as virtual machines. A virtualized computing environment can include various host devices that are executing virtual machines that perform various tasks for an enterprise. The virtualized computing environment can support a virtual desktop infrastructure, server infrastructure, user authentication services, security systems, or other computing needs and tasks that might be required by an enterprise. The virtualized computing environment can be managed by a virtualization management system that can manage a virtual infrastructure across a public, private, or hybrid cloud environment. The virtualization management system can also orchestrate containerized execution environments that allow an enterprise to deploy or publish applications for its users.

Due to a proliferation of the number of clouds and the type of services offered by cloud computing environments, enterprises may have several different deployments in several different cloud computing systems. Deployments across many different cloud computing systems offer many advantages, but increase the complexity of configuring the cloud resources' access to on-premises resources in the private datacenters of enterprises. Providing access to resources such as applications in a first network (e.g., data center or cloud) to entities in a second network (e.g., data center or cloud) is difficult to achieve in an effective and secure manner. Accordingly, there is a need in the art for improved techniques for inter-network, secure resource connectivity.

DETAILED DESCRIPTION

Figure 1:
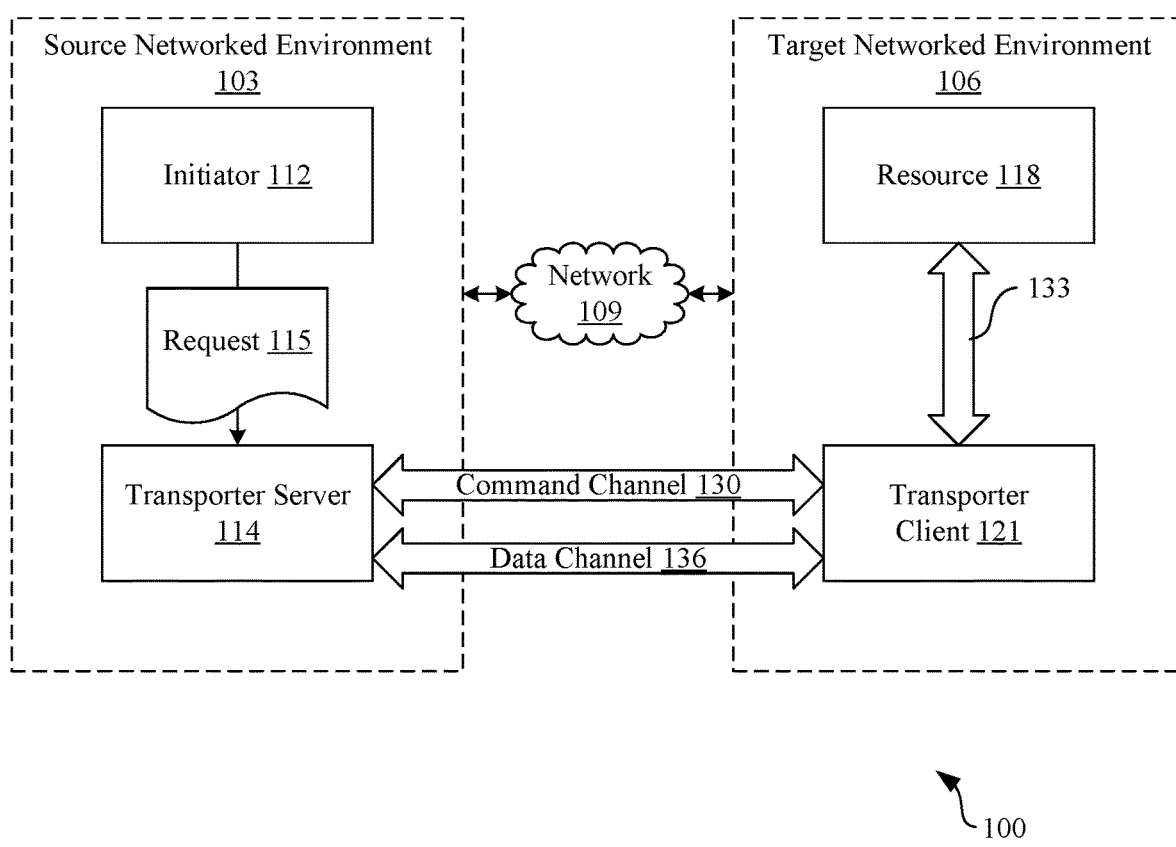
FIG. 1 is an example of a block diagram of illustrating inter-network connectivity between two networked environments.

The present disclosure relates to protocol switching and cross-wiring to enable inter-network connectivity. For example, in scenarios where systems in different cloud computing environments or domains attempt to communicate with one another, intermediate components (e.g., firewalls, load balancers) in the data path between the different environments may prohibit or otherwise restrict such inter-network connections. To overcome this problem, the present disclosure relates to a transporter system that securely connects applications to resources in differing networked environments (e.g., clouds and/or data centers) with minimal administrative overhead and no requirement to configure external inbound connectivity in the target networked environment (e.g., cloud computing environment or data center) in which the resource being accessed is located. In addition, the present disclosure allows for protocol switching such that data channels that are established as SSL connections (e.g., Secure Websockets (WSS)) can be modified to a basic socket channel (e.g., transmission control protocol (TCP)) to permit socket level data stream communications when only one side (e.g., cloud computing environment, data center, etc.) allows an SSL connection.

According to various examples, the Transporter system of the present disclosure enables an application or system to submit a request to a target resource that is otherwise inaccessible to the application (e.g., network constraints, security constraints, etc.). For example, the initiating application or system (e.g., initiator) that is submitting the request may be in a separate networked environment (e.g., cloud computing environment, data center, etc.) from the target resource. The target resource may, for example, be an application, a system, a service, a function provided by an application, system, or service, data, a physical computing resource, and/or the like. In some embodiments, the target resource is internal to the target computing environment (e.g., cloud computing environment, data center, etc.), while in other embodiments the target resource is outside the target computing environment but reachable from the target computing environment.

According to various examples, the Transporter system of the present disclosure may comprise a transporter server and a transporter client. In various examples, the transporter server may be in the same networked environment as the initiator or may be in a different location (e.g., different network). The transporter client may be located in the same networked environment as the target resource and may be in communication via a command channel with the Transporter server. As will be discussed in further detail with regard to FIG. 1, an application in one networked environment may send a request to access a resource in another networked environment. In various examples, the request can be received by the transporter server and then forwarded to the transporter client in communication with the transporter server and the resource associated with the request. As such, the transporter client may send the request to the resource. The resource may then respond to the request, and the response may be sent back through the transporter client and the transporter server to the initiator. It is noted that the transporter server does not initiate a connection to the transporter client. Rather, the transporter client initiates the command channel connection to the transporter server, and bi-directional message exchanges over this command channel facilitate the handling of initiator requests.

In various embodiments, the command channels and the data channels that are established for cross-connectivity communications can initially be WSS connections. However, in various examples, while a command channel may remain a WSS connection for its lifetime, the protocol for the data channel(s) can be modified from a WSS connection to a basic socket channel (e.g., TCP, UDP) to permit a data stream of uninterpreted bytes to be sent between the different networks. Another difference between a command channel and a data channel is that a data channel is created on a per-request basis, while a command channel is long-lived (e.g., not being associated with any one request). As such, if an initiator sends a request to the transporter server, the transporter server will use the command channel to request a data channel to handle the current request. The data channel may exist for the duration of the initiator's request, after which the data channel may be promptly destroyed.

According to various embodiments, the techniques described herein allow inter-network resource connectivity without requiring separate configuration of the target resource or the initiator for such connectivity. For example, by providing a transporter client that can be easily deployed (e.g., from an image) in a target networking cloud or data center, there is no need to perform additional configuration in the target cloud or data center or to set up a reverse proxy in the target cloud or data center.

Turning now to FIG. 1 shown is a block diagram illustrating an inter-networked connectivity environment 100 according to various embodiments. The inter-networked connectivity environment 100 can include a source networked environment 103 and a target networked environment 106 which are in communication via a network 109. The network 109 can include wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The source networked environment 103 and the target networked environment 106 can each include, for example, a server computer, or any other system providing computing capability. Alternatively, the source networked environment 103 and the target networked environment 106 can each include a plurality of computing devices that are arranged, for example, in one or more server banks, computer banks, or other arrangements. The networked environments 103, 106 can include a grid computing resource or any other distributed computing arrangement. The computing devices can be located in a single installation or can be distributed among many different geographical locations.

In various examples, the source networked environment 103 and the target networked environment 106 can each also include or be operated as one or more virtualized computer instances. Although not illustrated, the components of the source networked environment 103 can be in data communication with one another via a network 109 that is specific to the source networked environment 103 and the components of the target networked environment 106 can be in data communication with one another via a network 109 that is specific to the target networked environment 106.

For purposes of convenience, the inter-networked connectivity environment 100 illustrates only the source networked environment 103 and the target networked environment 106. However, it is understood that the inter-networked connectivity environment 100 can include a plurality of networked environments 103, 106. In various examples, the source networked environment 103 and the target networked environment 106 may, for example, be cloud computing systems or data centers. For example, the target networked environment 106 may be a software-defined data center (SDDC) and the source networked environment 103 may be a public cloud.

As shown in FIG. 1, the source networked environment 103 can comprise an initiator 112, a transporter server 114, and/or other systems, services, or applications. In various examples, the target networked environment 106 can comprise a transporter client 121, one or more resources 118, and/or other systems, services, or applications. In various examples, the initiator 112, the transporter server 114, the transporter client 121, and the resources 118 may individually run on one or more physical computing devices comprising memory, one or more processors, and the like.

In various examples, the initiator 112 generally represents an application, service, or system that initiates a request 115 to access a target resource 118 in target networked environment 106. In an example, as described in more detail below with respect to FIG. 2, the initiator 112 can comprise a cloud director, which is a software component that manages allocation of virtual computing resources to an enterprise for deploying applications. An example of a cloud director is VMWare® Cloud Director®. The target resource 118 may, for example, be a component of an SDDC, such as a virtualization manager and/or network manager that perform management functions with respect to virtual computing instances (VCIs), allocation of physical computing resources, virtual networks, and/or the like. For instance, a request 115 may be a request to a network manager of the target computing environment 106 to retrieve a list of virtual networks associated with the target computing environment 106.

The transporter server 114 generally comprises a software and/or hardware component that is connected to a transporter client 121 in the target networked environment 106, and allows connectivity between initiators 112 in source networked environment 103 and resources 118 located in and/or accessible from target networked environment 106. As described in more detail below with respect to FIG. 2, the transporter server 114 may comprise a forward proxy 124 that receives the request 115 from the initiator 112 and a reverse proxy 127 that is connected to the transporter client 121 in the target networked environment 106.

In various examples, the initiator 112 and the transporter server 114 may run on one or more physical computing devices comprising memory, one or more processors, and the like. In various examples, the transporter client 121 can establish a command channel 130 with the transporter server 114. In various examples, the command channel 130 is a secure communication channel for transmission of commands and/or other communications between the transporter client 121 and the transporter server 114. In one example, the command channel 130 is established using a WebSocket secure (WSS) protocol. WSS protocol connections are initiated over hypertext transfer protocol (HTTP) and are typically long lived such that messages can be sent in either direction at any time and are not transactional in nature. A WSS connection will typically remain open and idle until either the client or the server is ready to send a message.

When the transporter server 114 receives a request 115 from the initiator 112, the transporter server 114 issues a command via the command channel 130 to the transporter client 121 to prepare to handle the request 115 that is directed to the target resource 118. In various examples, the transporter client 121 processes this command by creating a connection to the target resource 118, thus forming a first data channel 133, and another connection back to the transporter server 114, thus forming a second data channel 136.

In various examples, the command channel 130 and the data channels 133, 136 can initially be established as WSS connections. However, according to various embodiments, while the command channel remains a WSS connection for its lifetime, the protocol of the data channel 133, 136 can modified from a WSS connection to a basic socket channel (e.g., TCP) over which uninterpreted bytes are sent. For example, the data channels 133, 136 can be established as WSS connections to enable an initial exchange of websockets management messages to signal a completion of the data path segments within the target networked environment 106. In addition, the data channels 133, 136 can be established as WSS connections to overcome any network restrictions (e.g., load balancer restrictions) that do not permit switching between different type of data traffic (e.g., switching from http traffic to socket-level traffic). For example, some load balancers will restrict sending arbitrary data over a connection that is expected to be HTTPS. Initializing the connection as a WSS connection and then switching to a basic socket-level connection to allow for transfer of arbitrary data can overcome this limitation.

In various examples, the transporter client 121 may send a command to the transporter server 114 indicating that the data path for fulfilling the request 115 has been created. The data path represented by the data channels 133 and 136 may be specific to the request 115, while the command channel 130 may not be specific to any one request. In various example, the command channel 130 is primarily responsible for orchestrating the creation of data paths (which include data channels 133, 136) to the target resources 118 in response to receiving a command to prepare for the request 115 from the initiator 112. A request's data path, which includes its dedicated data channel, typically lasts only for the duration of the request 115, whereas command channels 130 persist as long as the transporter client 121 is connected to the transporter server 114. In various examples, data channels 133, 136 may exist for the duration of the initiator's request 115, after which data channels 133, 136 may be promptly destroyed.

According to various examples, the request 115 (and/or other data associated with the request 115) may be sent to the transporter client 121 via the second data channel 136 and then to target resource 118 via the first data channel 133. A response to the request 115 may then be sent back from the target resource 118 to the transporter client 121 via the first data channel 133, then sent from the transporter client 121 to the transporter server 114 via the second data channel 136, and then returned to the initiator 112 via the transporter server 114. As can be appreciated, once the data paths are established and the protocols of the data channels 133, 136 are converted from a WSS connection to a socket-level connection, the data exchanged between the initiator 112 and the resource 118 can be exchanged as socket-level data without any network restrictions that would otherwise prevent such communication between the source networked environment 103 and the target networked environment 106.

It is noted that while certain types of initiators 112, requests 115, and target resources 118 are described herein as examples, these examples are not limiting and other types of initiators, requests, and target resources are possible. Furthermore, while certain architectural arrangements and locations of components are described herein, other arrangements and locations are possible.

Figure 2:
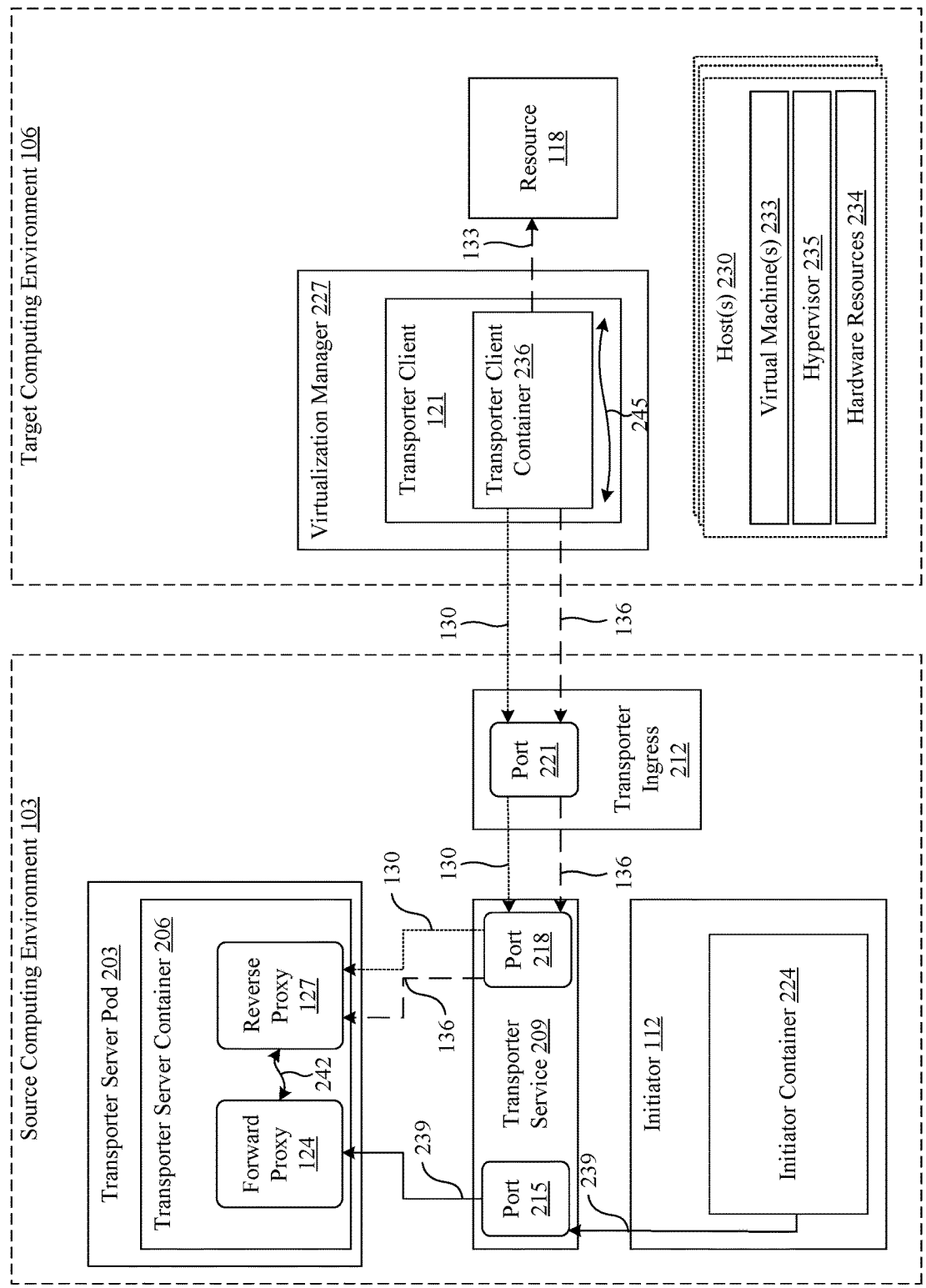
FIG. 2 is another example of a block diagram illustrating the inter-network connectivity of the two networked environments of FIG. 1.

Turning now to FIG. 2, shown is another example of a block diagram illustrating a detailed example of the inter-network connectivity of the two networked environments of FIG. 1 according to various examples of the disclosure. As illustrated in FIG. 2, the source networked environment 103 comprises a transporter server pod 203. In various examples, the transporter server pod 203 represents a non-limiting example implementation of the transporter server 114 of FIG. 1. In various examples, a pod can comprise a logical construct that generally includes multiple containers, such as a main container and one or more sidecar containers, which are responsible for supporting the main container. In various example, the transporter server container 206 may be a main container of the transporter server pod 203, and one or more additional containers (not shown) may provide support functions such as logging and/or data storage for the transporter server container 206. While a single pod is shown, a service deployment may include one or more pods, individual containers, virtual machines (VMs), and/or other VCIs. In one embodiment, the transporter server pod 203 is implemented as a platform as a service (PAAS) or container as a service (CAAS) object such as, for example, a Kubernetes® object.

In various examples, the transporter server container 206 comprises a forward proxy 124 and a reverse proxy 127. In various examples, the forward proxy 124 and the reverse proxy 127 are servers that can be implemented as software components within the transporter server container 206. In various examples, a forward proxy is generally used to pass requests 115 from an isolated, private network to an external endpoint (e.g., via a network 109) through a firewall. A reverse proxy generally refers to a component that sits in front of a server and forwards client requests to that server. Reverse proxies are typically implemented to help increase security, performance, and reliability.

In the example of FIG. 2, the forward proxy 124 may sit in front of one or more clients (e.g., initiator 112) to ensure that no target resource 118 ever communicates directly with that specific initiator 112. The reverse proxy 127 sits in front of a target resource 118 and ensures that no client (e.g., initiator 112) ever communicates directly with that target resource 118. It is noted that while a single reverse proxy 216 is shown, the transporter server container 206 may comprise a plurality of reverse proxies 127 associated with different target resources 118 in one or more networked environments 103, 106. In the present case, a combination of a forward proxy 124 and a reverse proxy 127 is used so that requests 115 can be sent to the forward proxy 124 from an initiator 112 in a source networked environment 103 (e.g., cloud or data center) while security of the target resource 118 is maintained by the use of the reverse proxy 127 that controls access to the transporter client 121 in the target networked environment 106 (e.g., cloud or data center). As shown in FIG. 2, the forward proxy 124 and the reverse proxy 127 are outside of the target networked environment 106, which allows the transporter server container 206 to potentially route proxy requests 115 to resources in multiple target networked environments 106 (e.g., clouds and/or data centers) via one or more reverse proxies.

In various examples, the source networked environment 103 can further comprise a transporter service 209 and a transporter ingress 212 that are associated with the transporter server pod 203. For example, the transporter service 209 and the transporter ingress 212 may be artifacts that are deployed as a consequence of the deployment of the transporter server pod 203. In various examples, the transporter service 209 comprises an inbound port 215 and an outbound port 218, which allow for communication to and from the transporter server pod 203. The transporter ingress 212 can comprise a port 221 that allows for communication between the transporter server pod 203 and endpoints in separate networking environments, such as the transporter client 121 in the target computing environment 106.

As previously discussed, the initiator 112 generally represents an application, service, or system that initiates a request 115 to access a target resource 118 in target networked environment 106. In various examples, the initiators 112 can comprise an initiator container 224. For example, the initiator 112 can comprise a cloud director pod and the initiator container 224 can comprise a cloud director container. In this example, the initiator 112 generally represents a deployment of a cloud director that manages allocation of virtual computing resources to an enterprise for deploying applications. Although illustrated as being included in the same networked environment as the transporter server pod 203 (e.g., source computing environment 103), in some examples, the initiator 112 may be located may be in a different networked environment (e.g., cloud and/or data center).

In various examples, the transporter server pod 203, the transporter server container 206, the transporter service 209, the transporter ingress 212, the initiator 112, and/or the initiator container 224 may run on one or more physical computing devices comprising memory, one or more processors, and the like.

In various examples, the target networked environment 106 may comprise a virtualized computing environment can be a data center controlled and administrated by a particular enterprise or business organization. The target networked environment 106 can also include hardware resources that are operated by a cloud computing service provider and exposed as a service available to account holders, such as the enterprise in addition to other enterprises. As such, the target networked environment 106 can include an on-premise data center as well as an off-premise data center(s). In some embodiments, the target networked environment 106 itself may be configured as a private cloud service provided by the enterprise.

In various examples, the virtualized computing environment 103 includes one or more hosts 230, which are also referred to as host devices or host computer systems. The virtualized computing environment (e.g., target networked environment 106) and its hosts 230 can be deployed as a VMware vSphere® environment that delivers and powers a virtual infrastructure. Hosts 230 can be constructed on a server grade hardware platform, such as an x86 architecture platform. The hardware platform of each host 230 can include conventional components or hardware resources 234 of a computing device, such as one or more processors (CPUs), system memory, a network interface, storage, and other I/O devices A host 230 can include or be in communication with storage, such as local storage devices (e.g., one or more hard disks, flash memory modules, solid state disks, and optical disks) and/or a storage interface that enables host 230 to communicate with one or more network data storage systems. Examples of a storage interface are a host bus adapter (HBA) that couples host 230 to one or more storage arrays, such as a storage area network (SAN) or a network-attached storage (NAS), as well as other network data storage systems.

The various components of hardware resources 234 of the hosts 230 can differ across different hosts 230. For example, the processor in one host 230 may belong to the Intel® family of processors while the processor in a different host 230 may belong to the AMD® family of processors. Processors may also differ in other ways, such as processor speed, architecture bit size, and in other ways.

Each host 230 is configured to provide a virtualization layer that abstracts processor, memory, storage, and networking resources of hardware platform into multiple virtualized execution contexts, which includes environments in which software, such as applications, may execute and be isolated from other software. Examples of virtualized execution contexts include virtual machines, containers (such as Docker containers), and other contexts. In some embodiments, the virtualized execution contexts are virtual machines 233 that can run concurrently on the same hosts. VMs 233 run on top of a software interface layer, referred to herein as a hypervisor 235, that enables sharing of the hardware resources of host 230 by VMs 233. One example of hypervisor 235 that may be used in an embodiment described herein is a VMware® ESXi hypervisor provided as part of the VMware vSphere® solution. Hypervisor 234 may run on top of the operating system of host 230 or directly on hardware components of a host 230.

The virtualized computing environment (e.g., target networked environment 106) can further include a virtualization management module (depicted in FIG. 2 as a virtualization manager 227) that can communicate with the plurality of hosts 230. In one embodiment, the virtualization manager 227 is a computer program that resides and executes in a central server, which may reside in target computing environment 106, or alternatively, can run in a virtual machine VM 233 in one of hosts 230. One example of a virtualization management module is the vCenter Server® product made available from VMware, Inc. The virtualization manager 227 configured to conduct administrative tasks for the virtualized computing environment, including managing hosts 230, managing VMs 233 running within each host 230, provisioning VMs 233, migrating VMs 233 from one host 230 to another host 230, and load balancing between hosts 230. In one embodiment, the virtualization manager 227 can manage and integrate virtual computing resources provided by a third party cloud computing system with virtual computing resources of virtualization manager 227 to form a unified "hybrid" computing platform.

The target computing environment 106 can further include or be in communication with one or more resources 118. A target resource 118 can comprise a service, system, or application that can perform an action based at least in part on a request. For example, the target resource 118 may comprise a component of an SDDC, such as a virtualization manager and/or network manager that perform management functions with respect to virtual computing instances (VCIs), allocation of physical computing resources, virtual networks, and/or the like. In some examples, the target resource 118 can be associated with one or more of the hosts 230 in the target networked environment 106. For example, the target resource 118 can be associated with a hypervisor 235 and/or other component associated with the host 230.

In various examples, the transporter client 121 can run within the virtualization manager 227. In other examples, the transporter client 121 can be separate from the virtualization manager 227. The transporter client 121 may comprise a transporter client container 236. For example, the transporter client 121 may be installed as a docker container or directly as a VM 233. In some embodiments, the transporter client 121 is deployed from an image, and does not require additional configuration to be performed within the target computing environment 106. It is noted that while a single transporter client 121 is depicted, there may be multiple transporter clients 121 in the target networked environment 106 and/or other networked environments that communicate with a single transporter server pod 203, such as via one or more reverse proxies 127 of the transporter server pod 203.

The directions of the arrows of channels 130, 133, 136, and 239 indicate the directions in which the connections are established, and data may flow in both directions via these channels (e.g., the arrows do not mean that these are one-way channels). In various examples, a command channel 130 is established between the transporter client container 236 and the reverse proxy 127 via port 221 of the transporter ingress 212 and the port 218 of the transporter service 209. For example, the transporter client container 236 may initiate a connection to reverse proxy 127, and command channel 130 may be established via WSS protocol. For instance, the transporter client container 236 may initiate the connection via a call to an application programming interface (API) method provided by the transporter server container 206, and provides an API token with the call so that the transporter server container 206 can authenticate the token. In some embodiments, the command channel 130 includes a secure sockets layer (SSL) connection that terminates at the transporter ingress 212.

In various examples, the initiator 112 may send a request 115 (FIG. 1) to the forward proxy 124 via the port 215 to access a function and/or obtain information of the resource 118 in the target networked environment 106, thereby establishing proxy channel 239. The transporter server container 206 determines that that command channel 130 corresponds to the target networked environment 106 in which the target resource 118 of the request 115 is located, and sends a connect request to the transporter client container 236 via the command channel 130. The transporter client container 236 then initiates a new connection to reverse proxy 127 for handling data related to the request, thereby establishing the tunnel data channel 136 via the port 221 of the transporter ingress 212 and port 218 of the transporter service 209. The transporter client container 254 also establishes tunnel data channel 133 with the resource 118 for servicing the request.

According to various examples of the present disclosure, the data channel 133 and the data channel 136 can be initially established as WSS connections to (1) allow the initial exchange of web-socket management messages to signal the completion of the data path segments (e.g., channel 133, channel 136) within the target networked environment 106 and (2) overcome any load balancer restrictions that prevent switching from http traffic to socket-level traffic. However, in accordance to various embodiments, upon determining that the data channels 133, 136 are established and there is a complete data path established between the initiator 112 and the resource 118, the WSS connections associated with the proxy channel 239, the data channel 136 and the data channel 133 can be modified to a basic socket-level connection to permit the exchange of uninterpreted data bytes by changing the protocol from WSS to a basic socket-level protocol (TCP/IP). For example, the reduction to the basic socket-level protocol can be initiated in response to the transporter server container 206 and/or the initiator 112 receiving the final web-socket management message indicating the completion of the data path within the target networked environment 106. Accordingly, the data exchange between the initiator 112 and the resource 116 regarding the initial request 115 can be in the form of a uninterpreted data stream.

In accordance to various embodiments, cross-wiring may be performed (e.g., cross-wiring 242 and 242) to ensure that data flows between the initiator 112 to the forward proxy 124, via tunnel channel 239, and the reverse proxy 127, as well as between tunnel channels 133 and 136, to the resource 118. In particular, the end-to-end, socket-level data path from the initiator 112 to the target resource 118 is formed by "cross-wiring" the connections and channels of the data path. As discussed, the data path can include three channels: tunnel channel 239 between the initiator 112 and the forward proxy 127, tunnel channel 136 between the reverse proxy 127 and the transporter client container 236, and tunnel channel 133 between the transporter client 121 and the resource 118. The segments are connected through "cross wiring" such that when the initiator 112 writes data, it is read by the forward proxy 124. The system then writes this data to an endpoint at the reverse proxy 127 (e.g. cross wiring 242). This data is this read by the transporter client 121 via the tunnel channel 136. This data is then written to an endpoint on the transporter client container 236 and then read by the resource 118, then writes this data to an endpoint. In another example, cross-wiring 242 causes reads on the forward proxy 124 to become writes on the reverse proxy 127, and vice versa. Similarly, cross-wiring 245 may cause reads on tunnel channel 133 to become writes on tunnel channel 136, and vice versa.

As such, a complete path for handling the data exchange for a particular request is established between the initiator 112 and the resource 118, comprising the proxy channel 239, the tunnel data channel 136, and the tunnel data channel 133. In some embodiments, the transporter server container 206 and/or the transporter client 121 may store information about these channels in a tunnel map, such as mapping a tunnel identifier to identifying information of the proxy channel 239, the tunnel channel 136, and/or the tunnel channel 133.

Figure 3:
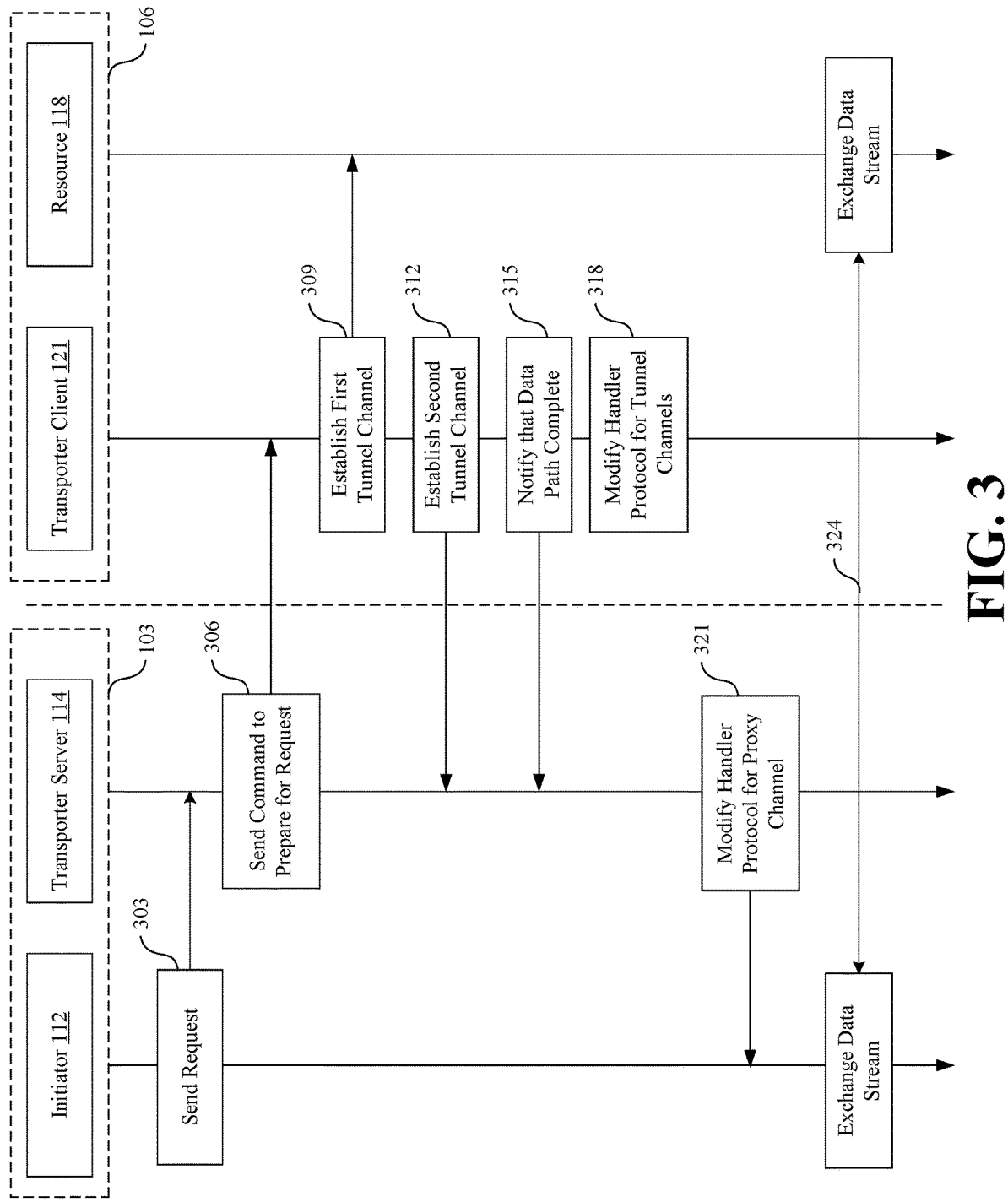
FIG. 3 is a sequence diagram depicting an example operation of the two networked environments of FIG. 1.

Referring next to FIG. 3, shown is a sequence diagram 300 depicting the interactions between the various components of the source networked environment 103 and the target networked environment 106 according to various embodiments of the present disclosure. The sequence diagram 300 of FIG. 3 is intended to illustrate how the transporter server 114 and the transporter client 121 establish the data channels between the initiator 112 and the resource 118 to allow for the exchange of uninterpreted data that may be otherwise restricted between the source networked environment 103 and the target networked environment 106. As an alternative, the sequence diagram 300 of FIG. 3 can be viewed as depicting an example of elements of a method implemented within inter-networked connectivity environment 100.

Beginning at step 303, the initiator 112 in a source networked environment 103 may generate and send a request 115 (FIG. 1) that is directed to a resource 118 in a target networked environment 106. For example, the request 115 may include a request to communicate with the resource 118 in the target networked environment 106. In various examples, the initiator 112 may require data that is provided by the resource 118. In various examples, the initiator 112 sends the request 115 to a transporter server 114 that is connected to the initiator 112 via a proxy channel 239 (FIG. 2). Although illustrated in FIG. 2 as being included in the source networked environment 103, in some examples, the transporter server 114 is outside of the source networked environment 103. However, it should be appreciated that the transporter server 114 is not included in the target networked environment 106.

At step 306, the transporter server 114 issues a command via the command channel 130 (FIG. 1) to the transporter client 121 to prepare to handle the request 115 that is directed to the target resource 118. In various examples, the transporter client 121 establishes the command channel 130 (FIG. 1) between the transporter client 114 and the transporter client 121 as the transporter client 121 starts or is otherwise initialized. In various examples, the command channel 130 is established as a WSS connection to permit the secure exchange of messages between the two networked environments. The command channel 130 is long-lived and stays connected regardless of whether this is an initiator request to process.

At step 309, the transporter client 121 identifies the location of the resource 118 associated with the request 115 and establishes a first tunnel channel 133 (FIG. 1) with the resource 118. In various examples, the first tunnel channel 133 is initially established as a WSS connection.

At step 312, the transporter client 121 establishes a second tunnel channel 136 (FIG. 1) with the transporter server 114. In various examples, the second tunnel channel 136 is initially established as a WSS connection. It should be noted that the second tunnel channel 136 differs from the command channel 130 in that the command channel 130 is established for the exchange of commands and messages between the transporter server 114 and the transporter client 121 while the second tunnel channel 136 is established as a section of the data path to facilitate the exchange of data and the request 115 between the initiator 112 and the resource 118.

At step 315, the transporter client 121 sends a message to the transporter server 114 over the command channel 130 indicating that the data path for exchanging data between the initiator 112 and the resource 118 is complete within the target networked environment 106. In particular, the message can comprise a WSS message packet that includes the notification that the data path is complete.

At step 318, the transporter client 121 modifies the handling protocol for the first tunnel channel 133 and the second tunnel channel 136. In particular, the handling protocol for the first tunnel channel 133 and the second tunnel channel 136 is initially a web-socket secure protocol. However, the web-socket secure protocol may restrict the exchange of uninterpreted data that may be required to satisfy the request 115 of the initiator 112 that is directed to the resource 118. As such, the transporter client 121 can modify the handling protocol by reducing the protocol to the basic socket-level protocol to allow for the exchange of uninterpreted data. For example, the handling protocol can be modified from WSS to TCP.

At step 321, the transporter server 114 receives the message over the command channel 130 that the data path is complete within the target networked environment 106. In response to receiving the message indicating the data path completion, the transporter server 114 can modify the handling protocol of the proxy channel 239. For example, the transporter server 114 can modify the handling protocol by reducing the initially established WSS protocol to the basic socket-level protocol to allow for the exchange of uninterpreted data. For example, the handling protocol can be modified from WSS to TCP.

At step 324, the initiator 112 and the resource 118 can exchange data associated with the request via the established data path formed by the proxy channel 239, second tunnel channel 136, and the first tunnel channel 133. Since the handling protocol has been modified or otherwise reduced to the basic socket-level, the exchange of data can include uninterpreted bytes of data without restriction. It should be noted that in accordance to embodiments of the disclosure, the exchange of data is performed using cross-wiring. In particular, cross-wiring may be performed (e.g., cross-wiring 242 and 242) to ensure that data flows between the forward proxy 124 and the reverse proxy 127 of the transporter server 114, as well as between tunnel channels 133 and 136. For example, cross-wiring 242 causes reads on the forward proxy 124 to become writes on the reverse proxy 127, and vice versa. Similarly, cross-wiring 245 may cause reads on tunnel channel 133 to become writes on tunnel channel 136, and vice versa. Thereafter, this process proceeds to completion.

Figure 4:
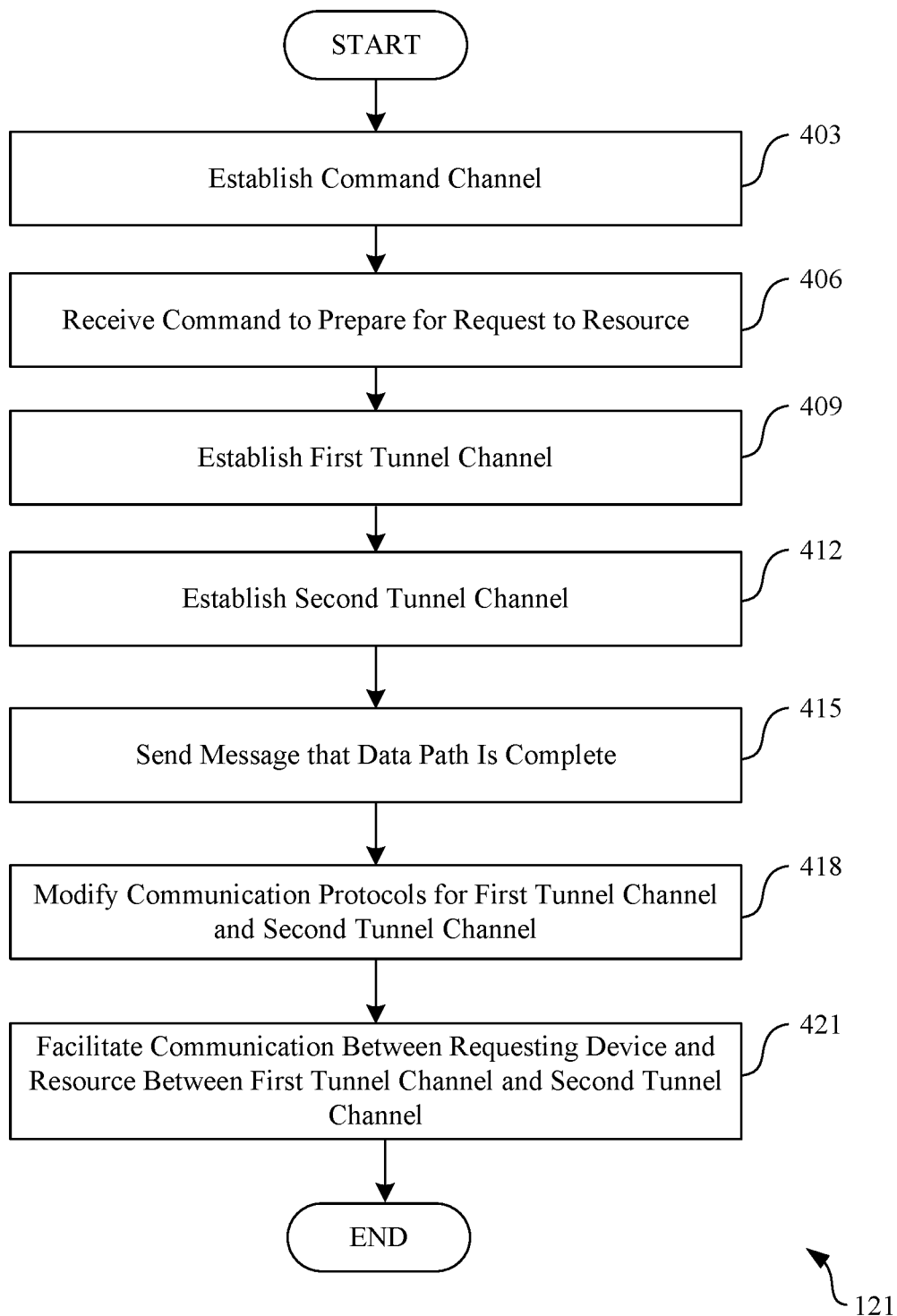
FIG. 4 is a flowchart depicting example operations of a component of the target networked environment of FIGS. 1 and 2.

Moving on to FIG. 4, shown is a flowchart that shows functionalities performed by the transporter client 121 of the target networked environment 106. Specifically, the flowchart shows how the transporter client 121 establishes the data path connections in the target networked environment 106 to facilitate the exchange of data between the initiator 112 (FIG. 1) in the source networked environment 103 (FIG. 1) and the resource 118 in the target networked environment 106.

Beginning with step 403, the transporter client 121 of the target networked environment 106 can establish a command channel 130 with a transporter server 114 in the source networked environment 103. In various examples, the command channel 130 is a secure communication channel for transmission of commands and/or other communications between the transporter client 121 and the transporter server 114. In various examples, the command channel 130 is established using a WebSocket secure (WSS) protocol.

At step 406, the transporter client 121 receives a command from the transporter server 114 via the command channel 130 connection requesting that the transporter client 121 prepare itself to handle a request 115 from an initiator 112 in the source networked environment 103 that is directed to a resource 118 in the target networked environment 106. In various examples, the command can include an identification of the resource 118 to allow the transporter client 121 to identify the appropriate resource associated with the request 115.

At step 409, the transporter client 121 establishes a first tunnel channel 133 with the resource 118. For example, the transporter client 122 can open a socket connection to the resource 118 and wait for the data to flow in from the initiator 112.

At step 412, the transporter client 121 establishes a second tunnel channel 136 with the transporter server 114. In various examples, the second tunnel channel 136 is initially established as a WSS connection. It should be noted that the second tunnel channel 136 differs from the command channel 130 in that the command channel 130 is established for the exchange of commands and messages between the transporter server 114 and the transporter client 121 while the second tunnel channel 136 is established as a section of the data path to facilitate the exchange of data and the request 115 between the initiator 112 and the resource 118.

At step 415, the transporter client 121 sends a message to the transporter server 114 over the command channel 130 indicating that the data path for exchanging data between the initiator 112 and the resource 118 is complete within the target networked environment 106. In particular, the message can comprise a WSS message packet that includes the notification that the data path is complete.

At step 418, the transporter client 121 modifies the communication protocols for the first tunnel channel 133 and the second tunnel channel 136. In various examples, the handling protocol for the first tunnel channel 133 and the second tunnel channel 136 is initially a web-socket secure protocol (e.g., WSS). However, the web-socket secure protocol may restrict the exchange of data that may be required to satisfy the request 115 of the initiator 112 that is directed to the resource 118. As such, the transporter client 121 can modify the handling protocol by reducing the protocol to the basic socket-level protocol to allow for the exchange of uninterpreted data. For example, the handling protocol can be modified from WSS to TCP.

At step 421, the transporter client 121 facilitates the exchange of data between the initiator 112 and the resource 118. In various examples, the exchange of data is performed using cross-wiring. In particular, cross-wiring may be performed (e.g., cross-wiring 242 and 242) to ensure that data flows between the forward proxy 124 and the reverse proxy 127 of the transporter server 114, as well as between tunnel channels 133 and 136. For example, cross-wiring 242 causes reads on the forward proxy 124 to become writes on the reverse proxy 127, and vice versa. Similarly, cross-wiring 245 may cause reads on tunnel channel 133 to become writes on tunnel channel 136, and vice versa. Thereafter, this process proceeds to completion.

Functionality attributed to the initiator 112, the transporter server 114, the transporter client 121, ad the resource 118 can be implemented in a single process or application or in multiple processes or applications. The separation or segmentation of functionality as discussed herein is presented for illustrative purposes only.

The sequence diagram of FIG. 3 and the flowchart of FIG. 4 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagram show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The transporter server 114, the initiator 112, the resource 118, the transporter client 121, or other components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the transporter server 114, the initiator 112, the resource 118, the transporter client 121, and/or other components can be stored in one or more storage devices and be executable by one or more processors. Also, a data store can be stored in the one or more storage devices.

The transporter server 114, the initiator 112, the resource 118, the transporter client 121, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that include software or program instructions can be embodied in any non-transitory computer-readable medium for use by or in connection with an instruction execution system such as a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in at least one computing device or by using multiple computing devices.

As used herein, "about," "approximately," and the like, when used in connection with a numerical variable, can generally refers to the value of the variable and to all values of the variable that are within the experimental error (e.g., within the 95% confidence interval for the mean) or within +/−10% of the indicated value, whichever is greater.

Where a range of values is provided, it is understood that each intervening value and intervening range of values, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A system, comprising:

at least one computing device; and program instructions executable in the at least one computing device that, when executed by the at least one computing device, cause the at least one computing device to:

receive a command from a transporter server to prepare for a request from a device in a source network that is directed to a resource in a target network, the source network being different from the target network, and the transporter server being outside the target network;

establish a first tunnel channel with the resource;

establish a second tunnel channel with the transporter server;

modify a handling protocol of the first tunnel channel and the second tunnel channel from a first, secure protocol to a second protocol to permit an exchange of data between the device and the resource using the second protocol; and facilitate the exchange of the data between the device and the resource using the second protocol and via the first tunnel channel and the second tunnel channel.

2. The system of claim 1, wherein the first protocol is a web-socket secure protocol.

3. The system of claim 2, wherein the second protocol is a transmission control protocol (TCP).

4. The system of claim 1, wherein, when executed by the at least one computing device, the program instructions cause the at least one computing device to send a message to the transporter server indicating that a data path is complete in the target network, the transporter server being in communication with the device via a third channel to complete the data path.

5. The system of claim 4, wherein the command and the message are transmitted over a command channel established between the transporter server and the at least one computing device.

6. The system of claim 5, wherein a handling protocol of the command channel is a web-socket secure protocol, and the handling protocol of the command channel remains unchanged.

7. The system of claim 1, wherein data reads received via the second tunnel channel become data writes via the first tunnel channel.

8. A method, comprising:

receiving, via at least one computing device, a command from a transporter server to prepare for a request from a device in a source network that is directed to a resource in a target network, the source network being different from the target network, and the transporter server being outside the target network;

establishing, via the at least one computing device, a first tunnel channel with the resource;

establishing, via the at least one computing device, a second tunnel channel with the transporter server;

modifying, via the at least one computing device, a handling protocol of the first tunnel channel and the second tunnel channel from a first, secure protocol to a second protocol to permit an exchange of data between the device and the resource using the second protocol; and facilitating, via the at least one computing device, the exchange of the data between the device and the resource using the second protocol and via the first tunnel channel and the second tunnel channel.

9. The method of claim 8, wherein the first protocol is a web-socket secure protocol.

10. The method of claim 9, wherein the second protocol is a transmission control protocol (TCP).

11. The method of claim 8, further comprising sending a message to the transporter server indicating that a data path is complete in the target network, the transporter server being in communication with the device via a third channel to complete the data path.

12. The method of claim 11, wherein the command and the message are transmitted over a command channel established between the transporter server and the at least one computing device.

13. The method of claim 12, wherein a handling protocol of the command channel is a web-socket secure protocol, and the handling protocol of the command channel remains unchanged.

14. The method of claim 8, wherein data reads received via the second tunnel channel become data writes via the first tunnel channel.

15. A non-transitory computer readable storage medium embodying executable instructions which, when executed by a processor, cause a computing device to at least:

receive a command from a transporter server to prepare for a request from a device in a source network that is directed to a resource in a target network, the source network being different from the target network, and the transporter server being outside the target network;

establish a first tunnel channel with the resource;

establish a second tunnel channel with the transporter server;

modify a handling protocol of the first tunnel channel and the second tunnel channel from a first, secure protocol to a second protocol to permit an exchange of data between the device and the resource using the second protocol; and facilitate the exchange of the data between the device and the resource using the second protocol and via the first tunnel channel and the second tunnel channel.

16. The non-transitory computer readable storage medium of claim 15, wherein the first protocol is a web-socket secure protocol.

17. The non-transitory computer readable storage medium of claim 16, wherein the second protocol is a transmission control protocol (TCP).

18. The non-transitory computer readable storage medium of claim 15, wherein, when executed by the computing device, the executable instructions cause the computing device to send a message to the transporter server indicating that a data path is complete in the target network, the transporter server being in communication with the device via a third channel to complete the data path.

19. The non-transitory computer readable storage medium of claim 18, wherein the command and the message are transmitted over a command channel established between the transporter server and the at least one computing device.

20. The non-transitory computer readable storage medium of claim 19, wherein a handling protocol of the command channel is a web-socket secure protocol, and the handling protocol of the command channel remains unchanged.

* * * * *